Aug. 13, 1929.  L. E. HILDEBRAND  1,724,837
METHOD OF CALIBRATING INSTRUMENTS
Filed Oct. 13, 1927
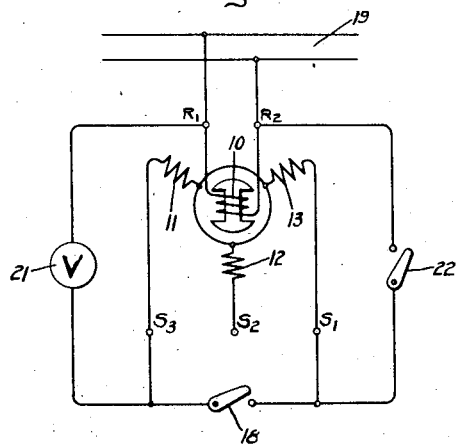
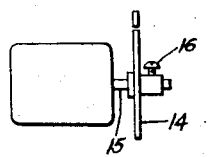
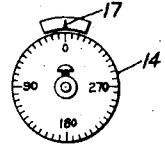
Inventor:
Lee E. Hildebrand,
by
His Attorney.

Patented Aug. 13, 1929.

1,724,837

UNITED STATES PATENT OFFICE.

LEE E. HILDEBRAND, OF CLIFTONDALE, MASSACHUSETTS, ASSIGNOR TO GENERAL ELECTRIC COMPANY, A CORPORATION OF NEW YORK.

METHOD OF CALIBRATING INSTRUMENTS.

Application filed October 13, 1927. Serial No. 226,029.

My invention relates to a method of calibrating instruments or devices used in the transmission of angular motion and has for its object a simple and reliable method of calibrating whereby the instruments may be thereafter connected together in a predetermined relation.

My invention has particular application to instruments for the transmission of angular motion provided with an alternating current field winding inductively cooperating with a polycircuit armature winding. It will be understood that a system for transmitting motion with these instruments involves the use of a sending or transmitting instrument and one or more receiving instruments having their armature windings electrically connected thereto, the field windings of the two instruments being connected to a suitable alternating current source of supply whereby electromotive forces are induced in the armature windings which produce currents when the voltages are unbalanced, whereby a torque is applied to the rotor of the receiver causing it to turn to a position of voltage balance which is the position of angular agreement with the transmitter. Each instrument carries a dial or other indicating member and it is desired that when the instruments are in angular agreement the dial of the receiving instrument should show the same reading as the dial of the transmitting instrument. In one of its aspects my invention relates to a method of calibrating the instruments as a result of which the dials are secured to the instruments in such relation and whereby the instruments may be electrically connected in such manner that the receiver will turn to a position in which its dial has the same reading as the dial of the transmitter. One method of making this calibration is described and claimed in Patent No. 1,554,915 to Hewlett et al., dated September 22, 1925.

In carrying out my invention I short circuit two predetermined terminals of the armature winding and apply a voltage to the field winding whereby the rotor is caused to turn by electromagnetic repulsion to one of two positions 180° apart, and then determine a predetermined one of those two positions by comparing the electromotive force induced in the armature winding with the electromotive force applied to the field winding.

For a more complete understanding of my invention reference should be had to the accompanying drawing in which Fig. 1 is a diagrammatic representation of means for calibrating instruments embodying my invention, while Figs. 2 and 3 are simplified side elevation and end elevation views, respectively, of a typical transmitting or receiving instrument.

Referring to the drawing, I have shown my invention in one form with reference to the calibration of an instrument for transmitting angular motion provided with a field winding 10 mounted on a rotor member and inductively cooperating with a polycircuit armature winding mounted on the stator, this winding being shown as comprising three coils, 11, 12 and 13, electrically connected in a Y or star connection. The terminals of the field armature windings are brought out in a definite relation with respect to the stator of the instrument, and in accordance with my invention I number these terminals in a definite order, for example, in a clockwise direction when facing a definite end of the instrument, such as the slip ring end. As shown, the terminals of the field winding are numbered $R^1$ and $R^2$, while the armature terminals are numbered $S^1$, $S^2$ and $S^3$ in this order. The object of this is to assure that the terminal having a given marking will in any instrument lead to a predetermined field or armature terminal. Any predetermined method of marking the terminals may be used, and as shown the terminals are marked in accordance with the method disclosed in the aforesaid patent to Hewlett and Willard. With the terminals of all the instruments thus marked any two instruments may obviously be connected together in a predetermined relation by interconnecting the armature terminals having the same markings.

It is further necessary, however, to secure the indicating member to each instrument in a predetermined relation. As shown in Figs. 2 and 3, a suitable calibrated dial 14 is secured to the rotor shaft 15 of the instrument. As shown, a clamping screw 16 is provided in the hub of the dial whereby the dial may be loosened and secured in any desired angular position on the shaft. The dial cooperates with a suitable fixed reference mark 17 which is secured to the stator of the instrument.

In making the setting of the dial, the rotor is first set in a predetermined zero position which is accomplished by short circuiting a predetermined pair of armature coils, such as the coils 11 and 13 which are short circuited by means of a switch 18 electrically connected across the terminals $S^1$ and $S^3$. This switch is closed to short circuit the coils and at the same time a source of alternating current supply 19 is connected to the field winding 10. This causes the rotor, by reason of the electromagnetic repulsion applied to the field winding, to turn to a position in which the electromotive forces induced in the coils 11 and 13 are equal whereby the voltage across the terminals $S^1$ and $S^3$ is zero, since the electromotive forces in the two coils are in opposition. It will be oserved that there are two positions of the rotor 180° apart in which the voltage across $S^1$ and $S^3$ is zero and in order to arbitrarily select one of these two positions the voltage induced across terminals $S^1$ and $S^3$ is compared with the voltage applied to the terminals $R^1$ and $R^2$ while the rotor is being turned in a predetermined direction. For this purpose a voltmeter 21, or other means such as an incandescent lamp for indicating voltage, is connected across a field and armature terminal, as shown the terminals $S^1$ and $S^3$, and a switch 22 is provided whereby the terminal $S^1$ can be connected directly to the terminal $R^2$. After the rotor has been brought to a position of zero voltage, the switch 18 is opened and the switch 22 is closed. The rotor is now turned, for example, by grasping it, through a small angle in a clockwise direction when facing the collector ring end of the instrument. A resulting increase in the voltmeter reading indicates that the voltage induced across the terminals $S^1$ and $S^3$ has the same polarity as that applied to the terminals $R^1$ and $R^2$, and when this increase is noted it will be known that the rotor has turned to the correct zero position. In case a decrease in the voltmeter reading is observed, it will be known that the rotor is in the wrong position and it will be turned through an angle of 180° to the correct position.

In the final setting of the dial the rotor is brought accurately to the zero position by opening switch 22 and again closing switch 18, after which the dial is secured to the rotor shaft in a predetermined position such as the zero position with reference to the mark 17.

In the previous description it will be noted that the zero position of the rotor has been taken as that position in which when an alternating electromotive force is applied to the terminals $R^1$ and $R^2$ the voltage induced between the terminals $S^1$ and $S^3$ is zero, and, furthermore, that position in which if the rotor is turned through a small angle in a clockwise direction when facing the collector ring end the voltage induced between the leads $S^1$ and $S^3$ has the same polarity as that applied to the terminals $R^1$ and $R^2$. It will be understood, of course, that this position has been chosen arbitrarily and that various other positions might be taken as the zero position; also other positions may be determined as a means for calibrating the instrument for several different positions.

In calibrating a transformer instrument, such as shown in Fig. 6 of the aforesaid patent to Hewlett and Willard, one of the armature windings of the transformer is used as a field winding. For example, where each winding comprises three legs connected in Y relation, as shown in the aforesaid patent, two of the terminals of one of the windings, for example, the winding on the rotor member, will be connected together and connected to one side of the supply circuit. The remaining terminal of this winding is connected to the other side of the supply circuit. The winding then generates a field which is a resultant of the fields produced by its three legs and consequently may be regarded for calibration purposes as the equivalent of the field winding 10. The instrument is then calibrated by proceeding as previously described.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States, is,—

1. The method of calibrating an instrument for the transmission of angular motion provided with a field winding and an inductively cooperating polycircuit armature winding, one of said windings being rotatably mounted and connected to drive indicating means, which consists in impressing an alternating electromotive force on said field winding while short circuiting a portion of said armature winding whereby said rotor is turned by electromagnetic repulsion to one of two positions, setting said rotatable winding in one of said two positions in which the electromotive force induced in said portion of the armature winding has a predetermined relation to said impressed electromotive force, and then setting said indicating means in a predetermined position by adjusting it independently of said rotatable winding.

2. The method of calibrating an instrument for the transmission of angular motion provided with a field winding and an inductively cooperating polycircuit armature winding, one of said windings being rotatably mounted and connected to drive the indicating means, which consists in impressing an alternating electromotive force on said field winding while short circuiting a portion of said armature winding whereby said rotor is turned by electromagnetic repulsion to one of two positions 180° apart, setting said rotatable winding in one of two positions in which the electromotive force induced in said portion of the armature winding has a predetermined polarity relation to said impressed electromotive force when said portion of the armature winding is connected to said field winding in a predetermined relation and said rotatable winding is displaced in a predetermined direction, and then setting said indicating means in a predetermined indicating position.

3. The method of calibrating an instrument for the transmission of angular motion provided with a field winding and an inductively cooperating polycircuit armature winding, one of said windings being rotatably mounted and connected to drive indicating means, which consists in impressing an alternating electromotive force on said field winding while short circuiting a portion of said armature winding whereby said rotor is turned by electromagnetic repulsion to one of two positions 180° apart, connecting said portion of the armature winding to said field winding in a predetermined parallel relation therewith while applying said electromotive force to said field winding, observing a voltage responsive indicating device included in one of said connections, setting said rotatable winding in one of two positions in which a predetermined relation is established between the voltages across the terminals of said windings as shown by said indicating means, setting said indicating means in a predetermined position by adjusting it independently of said rotor, and then connecting said indicating means to said rotor in a fixed driving relation therewith.

4. The method of calibrating an instrument for the transmission of angular motion comprising inductively cooperating field and polycircuit armature windings, one of said windings being mounted on a rotor member, and an indicating device driven by said rotor member, which consists in marking the terminals of said windings in a predetermined order, applying an alternating electromotive force to said field winding while short circuiting a portion of said armature winding whereby said rotor is turned by electromagnetic repulsion to one of two positions 180° apart, setting said rotor in one of said positions constituting an electrical zero position such that a predetermined relation is established between the voltage applied to said field winding and the voltage induced in said armature winding, and then setting said indicating means in a mechanical zero position.

5. The method of calibrating an instrument for the transmission of angular motion comprising a single circuit field winding on a rotor element, indicating means driven by said rotor, and a polycircuit armature winding on a stator element, which consists in marking the terminals of said field and armature windings in a predetermined order, impressing an alternating electromotive force on said field winding while short circuiting a portion of said armature winding whereby said rotor is turned by electromagnetic repulsion to one of two positions 180° apart, setting said rotor in one of said positions such that upon displacement of the rotor from that position in a given direction the electromotive force induced in said portion of the armature winding bears a definite relation to the electromotive force impressed on said field winding, and then setting said indicating means in a predetermined indicating position.

In witness whereof, I have hereunto set my hand this eleventh day of October, 1927.

LEE E. HILDEBRAND.